UNITED STATES PATENT OFFICE.

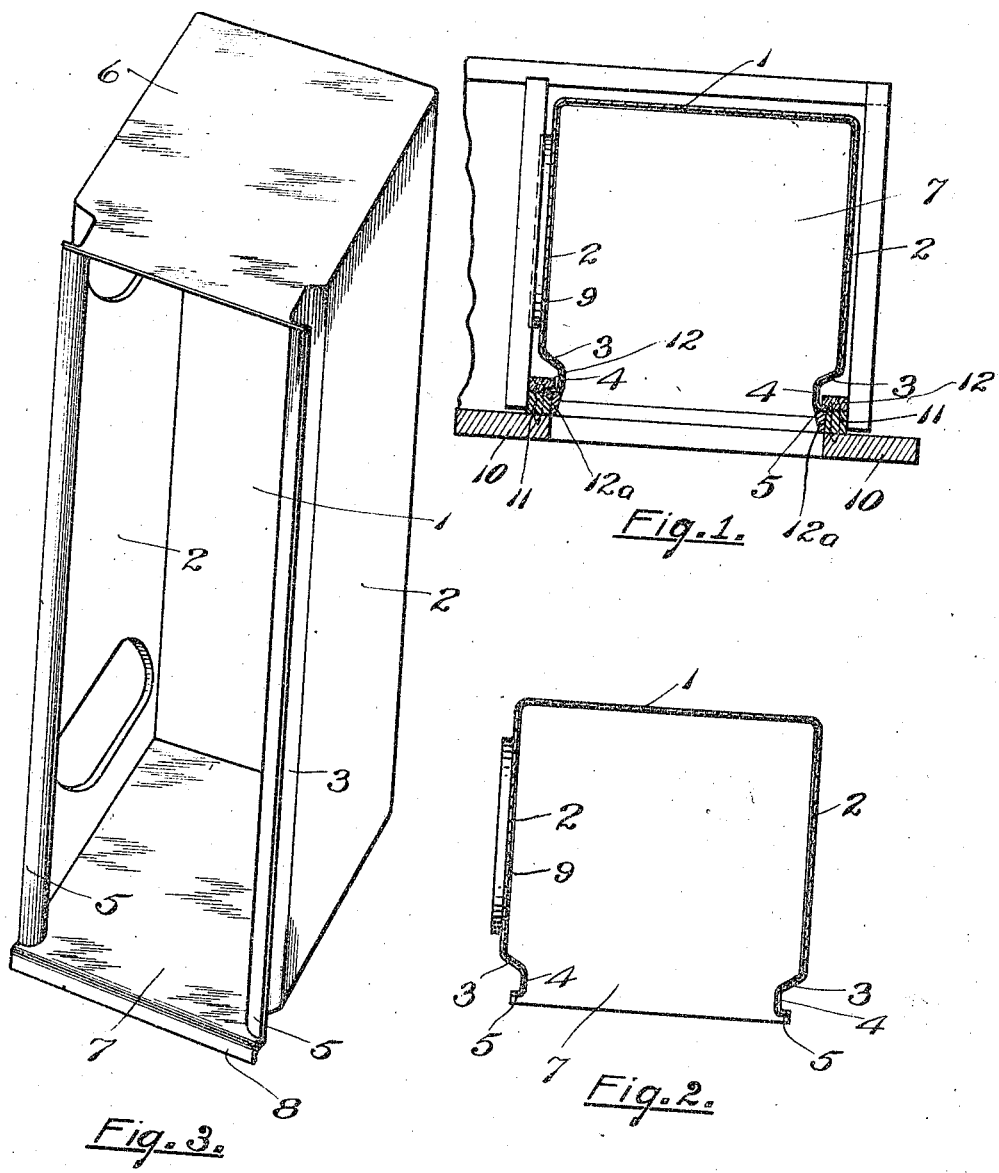

WALTER H. WHITTIER, OF GRAND RAPIDS, MICHIGAN, ASSIGNOR TO GRAND RAPIDS REFRIGERATOR COMPANY, OF GRAND RAPIDS, MICHIGAN, A CORPORATION OF MICHIGAN.

LINING FOR REFRIGERATORS.

1,147,288.  Specification of Letters Patent.  Patented July 20, 1915.

Application filed July 6, 1914.  Serial No. 849,172.

*To all whom it may concern:*

Be it known that I, WALTER H. WHITTIER, a citizen of the United States of America, residing at Grand Rapids, in the county of Kent and State of Michigan, have invented certain new and useful Improvements in Linings for Refrigerators; and I do hereby declare the following to be a full, clear, and exact description of the invention, such as will enable others skilled in the art to which it appertains to make and use the same.

This invention relates to linings for refrigerators and especially to the linings in refrigerators for the compartments in which provisions are kept.

It is the primary object and purpose of this invention to provide a lining which from its construction, is sanitary and can be cleaned with greater ease and facility than heretofore, making it possible to more easily keep the compartment in sanitary condition.

A further object of the invention is to so form the lining adjacent its open side, that the securing of the lining in the refrigerator is more readily accomplished than before. Also, by the use of such construction, a novel means of securing the lining in place, is made possible, one of the objects of the invention being the provision of said novel means.

For understanding of the construction by which these objects and purposes are attained, reference may be had to the accompanying drawings in which, Figure 1 is a horizontal section through the lining and a portion of the refrigerator, illustrating the means of securing the lining in position. Fig. 2 is a similar view of the lining. Fig. 3 is a perspective view of the lining taken from in front and above the open side therefor.

Similar reference characters refer to similar parts throughout the several views of the drawing.

As shown in the drawing, the lining is substantially rectangular in cross section and is formed from metal which is welded together to provide a practically seamless construction, having back 1 and sides 2 extending forward from the back, said sides adjacent the forward edges of the lining being turned inwardly toward each other at 3 for a short distance, then carried forward as shown at 4 for a short distance and finally turned outward at 5, the edges of the lining being positioned slightly inward of the sides 2 as shown. A top 6 and bottom 7, said bottom having front downward extension 8 complete the lining leaving an open front side through which the provisions may be inserted as will be readily understood. The entire interior of said lining is faced with porcelain indicated at 9 providing an inner surface very hard and durable and one readily cleaned so that by very little trouble the lining may be kept always in perfect sanitary condition. In this connection it will be noted that the junction of parts 2 and 3 of the lining, are at a rounded obtuse angle making it very easy to clean, there being no cracks or depressions liable to retain grease or other undesirable materials but every part of the lining being very easily reached for cleansing. This is an important feature of my invention, and one which has proved to be of great importance in this connection.

The construction of the lining at its forward vertical edges makes it very easy to be firmly secured in place in a refrigerator. Referring to Fig. 1, the front frame 10 of the refrigerator has secured thereto at the edges of the front opening therein, posts 11, and against the rear edges of these posts and the outturned portions 5 of the lining bear strips 12 being secured by screws, or other fastening means to the posts 11, thereby binding the parts 5 for their entire length against the posts 11 thus forming a very secure method of positioning the lining in place. Finishing strips 12ª are attached to the inner sides of the posts 11 and serve to cover the joints and to make a smooth and unbroken surface from the forward edge of the lining. It will be understood that in the manufacture of these refrigerators the outer frame structure is built around the lining and it is practically impossible to remove the lining once the refrigerator construction is complete without destroying the refrigerator.

From the foregoing it will be apparent that I have provided a new and improved refrigerator lining, one that is sanitary in all respects and one that is specially easy to keep in sanitary condition. The strips 12ª covering the edges of the lining, serve as a protective means against the porcelain chipping or cracking at the lining edges, this being a feature of considerable importance in the refrigerator construction. The method of securing the lining in place is very simple but one of great practical efficiency and value.

I claim:—

1. In a refrigerator, a lining having vertically spaced apart sides and an integral back connecting said sides, the sides being bent inwardly and then outwardly adjacent their forward edges, a frame back of which the lining is located with the outwardly bent portions of the sides lying substantially parallel to the rear of the frame, and means attached to the frame extending over the said outwardly bent portion to thereby secure the lining to the frame.

2. In a refrigerator, a lining having spaced apart sides with the forward portion of each side bent inwardly and then outwardly, forming depressions in the outer sides of the lining at the forward edges thereof, a frame, and means seating in the depressions and attached to the frame, thereby securing the lining in fixed relation to the frame.

3. In a refrigerator, a lining having spaced apart vertical sides, with the forward portion of each side bent inwardly, forming depressions in the outer sides of the lining at the forward edges thereof, a frame, and a strip seated in each depression the full length thereof and attached to the frame, thereby binding the lining in fixed relation to the frame the full length of the vertical sides thereof.

4. In a refrigerator, a lining having spaced apart sides, a top and bottom, each of said sides being bent inwardly toward each other at an obtuse angle to the main body of the sides, then forwardly and then outwardly in substantially parallel relation to the back, forming a groove extending the full length and at the front of the lining, a frame in front of the lining, spaced apart posts secured to the frame, and bearing against the outturned edges of the lining, means extending into the grooves and secured to the posts for securing the lining in fixed relation to the frame, and finishing strips secured to the posts on the inner sides thereof, substantially as described.

In testimony whereof I affix my signature in presence of two witnesses.

WALTER H. WHITTIER.

Witnesses:
HOWARD H. WARRINGTON,
LUTHER V. MOULTON.